Figures 1, 2, 3:
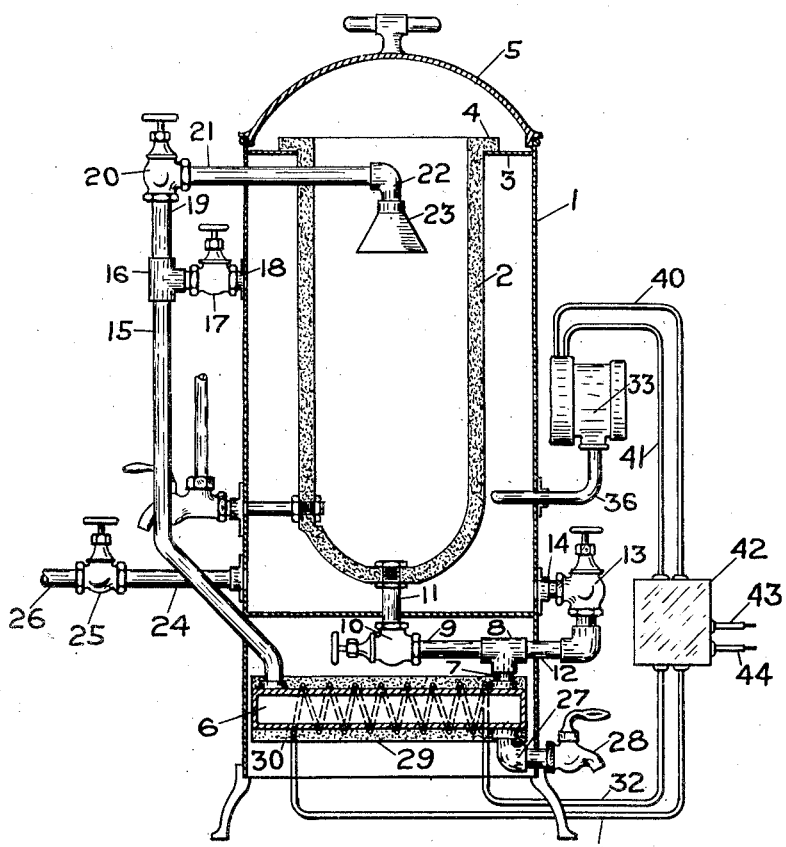

W. F. CLARK.
BEVERAGE URN.
APPLICATION FILED DEC. 24, 1919.

1,389,628.

Patented Sept. 6, 1921.

Inventor
Warren F. Clark
By
Thurston, Kwis & Hudson
Attorneys

UNITED STATES PATENT OFFICE.

WARREN F. CLARK, OF CLEVELAND, OHIO, ASSIGNOR, BY MESNE ASSIGNMENTS, TO AUTOMATIC ELECTRIC HEATER COMPANY, OF WARREN, PENNSYLVANIA, A CORPORATION OF DELAWARE.

BEVERAGE-URN.

1,389,628. Specification of Letters Patent. Patented Sept. 6, 1921.

Application filed December 24, 1919. Serial No. 347,239.

*To all whom it may concern:*

Be it known that I, WARREN F. CLARK, a citizen of the United States, residing at Cleveland, in the county of Cuyahoga and State of Ohio, have invented a certain new and useful Improvement in Beverage-Urns, of which the following is a full, clear, and exact description.

This invention relates to an urn construction, such as commonly used for the preparation of hot beverages and maintaining them in heated condition after preparation.

The purpose of the present invention is to provide a construction by which there is obtained in the urn a circulation of heating water by which the beverage after being prepared is maintained in heated condition, and held at the temperature at which it is desired to maintain it, and furthermore, the construction is so arranged that the beverage may be prepared in the urn and a circulation of the beverage liquor obtained simultaneously with the heating thereof. Furthermore, the construction of the apparatus is such that the heated water either in part or in whole which is used to maintain the beverage in predetermined heated condition may be utilized in the preparation of a fresh supply of the beverage.

The urn which is shown and described is of a type particularly adapted to serve as a coffee urn, although no limitation is intended in this particular, as obviously the principles of construction may be embodied in urns adapted to handle other beverages.

Referring to the drawings, Figure 1 shows in part an elevation and in part a sectional elevation of an urn embodying the features of the invention; Fig. 2 is an elevation somewhat diagrammatic in nature, illustrating a pressure regulator by which the functioning of the heating element is controlled; Fig. 3 is a diagram showing certain electrical connections where the urn is heated by electricity.

In the drawings, 1 represents a container which is of proper size and shape to hold a quantity of water necessary to immerse to a suitable degree a second container 2 which is mounted within the container 1. The container 2 is supported within the container 1 and in the particular construction shown the container 1 is provided with an inwardly extending flange or support 3 which engages beneath a flange or collar 4 at the upper end of the container 2. The container 2 may be made of any suitable material such as is now commonly used in the art, such as porcelain or a vitreous enameled metal container.

The container 1 is provided with a cover 5 which serves to cover not only the container 1 but the container 2. This cover being removable gives ready access to the interior of both of the containers mentioned.

Beneath the container 1 there is mounted a closed heating container 6. This heating container may be formed as a cylindrical pipe, the pipe being lined with enamel where such is desirable. This container 6 is closed at both its ends and at one end there is a pipe 7 which connects with a T 8. From one portion of the T there is a pipe 9 which connects with a valve fitting 10 and the valve fitting connects with a pipe 11 which is connected with the low part of the beverage container 2.

The other end of the T 8 is connected with a pipe 12 which by means of a suitable elbow is connected with a valve 13 which in turn is connected with the interior of the container or reservoir 1 adjacent the lower portion thereof as indicated at 14.

The opposite end of the heating container 6 to that which has just been described, is connected with a pipe 15 which at a portion thereof is provided with a T 16, the T connecting with a valve 17, which valve is in turn connected with the interior of the container or reservoir 1 at a point adjacent the upper part thereof, as indicated at 18. The T 16 is also connected with a pipe 19 which communicates with a valve 20; from the valve 20 there is a pipe 21 which extends through the container 1 and into the upper portion of the container 2. This pipe is provided with a down spout 22 which may or may not be provided with a hood 23.

Adjacent the lower end of the container 1 there is a pipe 24 which communicates with the interior of the casing 1 and this pipe is provided with a valve 25. Beyond the valve 25 is a pipe 26 which is adapted to be connected with a source of water supply either the usual water supply of a house or building or any other source of water supply.

The heating container 6 has an outlet pipe indicated at 27 which communicates with the lowermost portion of the heating container 6. This pipe is provided with a valve which in the present instance is shown as a faucet 28.

The heating container 6 may be heated in any desired manner but in the present instance the container 6 is shown as heated by an electric resistance coil 29, which is wound around the outer wall of the container 6 and extends substantially throughout the length of the container. The coil 29 is incased or embedded in heat insulating material which is molded upon the container 6 as indicated at 30. The coil at its opposite ends connects with conductors 31 and 32 which are connected with a source of electric current.

As will be well understood it is very desirable and quite necessary to control the functioning of the heating coil 29 in such a manner as to supply heat only at such times as it is necessary in order to maintain the desired temperature of the fluid which may be circulating through the heating container 6. For this purpose, a pressure control element, which is generally indicated at 33, is provided. This control element forms no part of the present invention and only sufficient description will be given to explain the functioning thereof.

The control element embodies a Bourdon tube 34 which at the end 35 thereof is connected with a tube 36. This tube extends through the wall of the container 1 so that at least a portion of the tube is immersed in the fluid such as water which may be contained within the container 1. The tube is filled with a readily volatilized substance such as ether, and as will be readily understood, the condition of the other within the tube 36 reacts upon the Bourdon tube 34 to cause movement of the tube in accordance with the pressure condition of the ether.

The Bourdon tube is provided with a pin 37. This pin extends beneath a flexible contact member 38 which contact member is adapted to coöperate with another contact member 39. These contact members are suitably mounted and insulated from each other. The contact member 38 is connected with the wire conductor 40, while the contact member 39 is connected with the conductor 41. The conductors 40 and 41 as well as the conductors 31 and 32 are electrically connected with a relay, which is generally indicated at 42, which relay is in turn connected with a suitable source of electricity which may be indicated by the conductors 43 and 44.

In Fig. 3 there is illustrated diagrammatically the electrical connections between the conductors 40 and 41 and 31 and 32 and the relay device.

The relay device itself comprises essentially a hollow coil 45 and extending through the hollow coil is a stem 46 which at its lower end carries a contact closing member 47. This contact closing member coöperates with contacts 48 and 49. The heating coil which is associated with the heating container 6 is indicated at 29 in this diagram.

From the diagram it will be seen that the pressure control member 33, when the contacts 38 and 39 are closed, permits a current to pass through the coil 45, thus closing the contacts 48 and 49 of the relay so that current may pass through the coil 29. When the Bourdon tube moves under expansion, it separates the contacts 38 and 39, thus protecting the flow of current through the member 45 and the member 47 moves to a position to open the connection between contacts 48 and 49 of the relay, thus the flow of current to the heating coil 29 is interrupted.

The foregoing description of the pressure control 33 and the relay 42 should be taken only as an illustration of one way in which the control described may be effected.

In the usual operation of the device the beverage is contained within the container 2 and is dispensed from this container by means of a suitable outlet which is not shown in the drawing. Surrounding the container 2 there will be a body of water which is contained within the container 1. This water is maintained in heated condition so as to keep the beverage in heated condition and at the temperature at which it is desired to dispense it.

If we assume that the beverage as prepard is within the container 2, the valves 10 and 20 are closed and the valves 13 and 17 are open. Water is introduced within the container 1 through the pipes 26 and 24, which are controlled by the valve 25. When the desired amount of of water is within the container 1 the valve 25 is closed.

Heat is then applied to the heating container 6 and by convection the heated water will rise through the pipe 15 and pass into the container 1 at the upper portion and simultaneously the cooler water at the lower end of the casing 1 will circulate through the pipe 12 and into the heating container 6.

This circulation of water which has just been described will be maintained as long as heat is applied to the heating container 6 and in fact the circulation will obtain as long as convection currents may be set up due to the difference in temperature of water in different parts of the system which has just been described.

The heating of the heating container 6 may be automatically controlled whether the heating means be electricity as heretofore described or whether it be some other form of heating means, but as the electricity system has been described, it will be seen that the functioning of the heating coil 29 will be controlled by the pressure conditions within the ether tube 36, so that the application of heat to the heating container 6 will be periodic and only sufficient to maintain the water within the container 1 at the desired temperature.

It frequently happens that it is required to renew the beverage within the container 2 and of course the beverage may be prepared and introduced into the container 2, but where the beverage requires hot water in the making thereof, such as for instance in the making of coffee, the apparatus is constructed so as to enable the making of the coffee in the urn itself.

The coffee itself may be introduced into the container 2 contained in a bag or in any other manner, as is well known, and the valve 17 is closed and the valve 20 opened. The valve 25 is opened slightly and the valve 13 allowed to remain open. The heat is applied to the heating container 6 and under these conditions the hot water which is contained within the container 1 will circulate through the heating container 6, through the pipe 15, through the pipe 21 and discharge into the container 2. When the desired quantity of water has thus been discharged into the container 2, the valve 20 is closed and the valve 17 is opened and the valve 25 allowed to remain open until the desired quantity of water is again introduced in the container 1.

As will be understood, in order to maintain the beverage within the container 2 in a hot condition, the water which is within the container 1 must be maintained in nearly boiling condition, so that the water within the container 1 is in excellent condition for the making of coffee or any other beverage of that character.

After the required amount of hot water has been introduced into the container 2, the valves 17 and 13 are closed and the valves 10 and 20 are opened. This causes a circulation of liquor from the container 2 through the heating member 6 and heat may be applied to the heating container 6 so that this liquor is heated to any desired degree.

By the continued circulation of the liquor, such as coffee liquor, the strength of the coffee is drawn from the ground beams and a coffee beverage of desired strength is produced.

Due to the circulating feature and simultaneous heating of the beverage liquor, and due to the fact that the hot water before used for heating the container 2 is available for making the new supply of beverage, such new supply may be very quickly made and may be brought to desired strength in a very short period of time.

It will be seen therefore that the urn construction which has been described is very complete in itself and does not necessitate the separate preparation of the beverage and its introduction into the beverage container.

Having described my invention, I claim:

1. An urn construction comprising a liquid container, a beverage container associated with the container, a heating container, means for heating said heating container, conduits connecting the heating container at two points and connecting with the liquid container at two points whereby fluid may be circulated through the heating container and the liquid container.

2. An urn construction comprising a liquid container, a beverage container associated with the liquid container, a heating container, conduits connecting the heating container at two points with the liquid container at two points and the beverage container at two points, valves associated with the said conduits whereby there may be obtained a circulation of fluid through the heating container and the beverage container or the heating container and the liquid container.

3. An urn construction comprising a liquid container, a beverage container, associated with the liquid container, a heating container located beneath the liquid container, means for heating the said heating container and conduits connecting the heating container with the liquid container whereby a circulation of fluid may be obtained through the heating container and the liquid container.

4. An urn construction comprising a liquid container, a beverage container associated with the first container, a heating container, conduits connecting the heating container and the liquid container whereby a circulation of fluid may be obtained through the heating container and the liquid container, an electric resistance element associated with the heating container and means for controlling the functioning of said electric element in accordance with the temperature condition of the liquid within the said container.

5. An urn construction comprising a liquid container, a beverage container associated with the first container, a heating container, conduits connecting the heating container and the liquid container and the beverage container, valves associated with said conduits whereby there may be obtained a circulation of fluid through the heating container and the liquid container or through the heating container and the beverage container, an electric heating element associated with the heating container and means for controlling the functioning of said electric heating element in accordance with the temperature condition of the liquid within the liquid container.

In testimony whereof, I hereunto affix my signature.

WARREN F. CLARK.